US011193046B2

(12) United States Patent
Schuh et al.

(10) Patent No.: US 11,193,046 B2
(45) Date of Patent: Dec. 7, 2021

(54) FLEXIBLE PRESSURE-SENSITIVE ADHESIVE TAPE FOR STRUCTURAL ADHESION

(71) Applicant: TESA SE, Norderstedt (DE)

(72) Inventors: Christian Schuh, Hamburg (DE); Yvonne Querdel, Ahrensburg (DE); Olga Kirpicenok, Hamburg (DE)

(73) Assignee: TESA SE, Norderstedt (DE)

( * ) Notice: Subject to any disclaimer, the term of this patent is extended or adjusted under 35 U.S.C. 154(b) by 169 days.

(21) Appl. No.: 15/760,733

(22) PCT Filed: Aug. 19, 2016

(86) PCT No.: PCT/EP2016/069714
§ 371 (c)(1),
(2) Date: Mar. 16, 2018

(87) PCT Pub. No.: WO2017/045865
PCT Pub. Date: Mar. 23, 2017

(65) Prior Publication Data
US 2018/0265741 A1    Sep. 20, 2018

(30) Foreign Application Priority Data

Sep. 17, 2015 (DE) ............... 10 2015 217 833.1

(51) Int. Cl.
| | | |
|---|---|---|
| *C09J 7/26* | (2018.01) | |
| *C09J 7/38* | (2018.01) | |
| *C08L 75/04* | (2006.01) | |
| *C08L 33/20* | (2006.01) | |
| *C09J 163/00* | (2006.01) | |
| *C09J 7/22* | (2018.01) | |
| *C09J 5/00* | (2006.01) | |
| *C08K 5/00* | (2006.01) | |

(52) U.S. Cl.
CPC ............... *C09J 7/26* (2018.01); *C08L 33/20* (2013.01); *C08L 75/04* (2013.01); *C09J 5/00* (2013.01); *C09J 7/22* (2018.01); *C09J 7/38* (2018.01); *C09J 163/00* (2013.01); *C08K 5/0025* (2013.01); *C09J 2301/124* (2020.08); *C09J 2301/302* (2020.08); *C09J 2301/408* (2020.08); *C09J 2415/00* (2013.01); *C09J 2463/00* (2013.01); *C09J 2475/006* (2013.01)

(58) Field of Classification Search
CPC ............... C09J 7/26; C09J 7/22; C09J 7/38
See application file for complete search history.

(56) References Cited

U.S. PATENT DOCUMENTS

| 3,208,959 | A | * | 9/1965 | Gmitter | ............... C08L 75/04 521/107 |
|---|---|---|---|---|---|
| 4,091,157 | A | | 5/1978 | Hori et al. | |
| 4,221,619 | A | | 9/1980 | Lemons | |
| 2008/0060757 | A1 | | 3/2008 | Hable et al. | |
| 2008/0193738 | A1 | * | 8/2008 | Hensley | ............... C08J 9/32 428/308.4 |

FOREIGN PATENT DOCUMENTS

| DE | 10 2010 002 501 A1 | 9/2011 |
|---|---|---|
| DE | 10 2011 008 191 A1 | 7/2012 |
| EP | 1 900 787 A2 | 3/2008 |
| EP | 2 014 734 A1 | 1/2009 |
| JP | S 5235228 A | 3/1977 |
| JP | S 5571773 A | 5/1980 |
| JP | S 62109880 A | 5/1987 |
| JP | 03045683 A * | 2/1991 |
| JP | H 0565467 A | 3/1993 |
| JP | 2002 19855 A | 8/2000 |
| JP | 2007-084767 A | 4/2007 |
| KR | 1982-0001591 B1 | 9/1982 |

OTHER PUBLICATIONS

Derwent Abstract of JP 03045683. See above for date and inventor.*
English translation of Korean Patent Application dated May 30, 2019.
English translation of Japanese Patent Application dated Mar. 13, 2019.

* cited by examiner

*Primary Examiner* — Chinessa T. Golden
(74) *Attorney, Agent, or Firm* — Norris McLaughlin, P.A.

(57) ABSTRACT

The present invention relates to a flexible, pressure-sensitively adhesive sheetlike structure for improved structural bonding, more particularly for clearance compensation, of diverse materials, such as metal, wood, glass and/or plastic, for example.

15 Claims, No Drawings

FLEXIBLE PRESSURE-SENSITIVE ADHESIVE TAPE FOR STRUCTURAL ADHESION

This application is a 371 of International Patent Application No. PCT/EP2016/069714, filed Aug. 19, 2016, which claims foreign priority benefit under 35 U.S.C. § 119 of the German Patent Application No. 10 2015 217 833.1, filed Sep. 17, 2015, the disclosures of which are incorporated herein by reference.

TECHNICAL FIELD OF THE INVENTION

The present invention relates to a flexible, pressure-sensitively adhesive sheetlike structure, more particularly a pressure-sensitive adhesive tape for structural bonding, more particularly for clearance compensation, of diverse materials, such as metal, wood, glass and/or plastic, for example, and particularly of bodywork components in the automobile industry.

GENERAL PRIOR ART

Structural bonding of components, such as in automaking, for example, by means of thermally curing liquid adhesives based on epoxide or on urethane has been known for years. These adhesives are applied via metering machines which are subject to complex control, and in general the adhesives do not possess an initial tack, meaning that the components have to be held in position over the full-curing period in order not to slip. A small number of pressure-sensitively adhesive systems have been described that are based on acrylates, which are inherently tacky, with epoxides. The acrylates usually contain epoxide functionalities, and so in the full-curing step the acrylates are likewise cured by way of the epoxide crosslinkers. These systems, however, lose their tack when the epoxide fraction in the liquid adhesive exceeds 50 wt %. It is high epoxide fractions in the liquid adhesive, however, which actually enable the components that are to be bonded to be bonded with high bond strengths, i.e., high shear strengths.

An additional disadvantage of such liquid adhesives is that in the thermal full-curing step they pass through a very low-viscosity phase, as a result of which they may propagate or "bleed out" in the bondline and above it as well, thereby causing contamination of the adherend components with the liquid adhesive. In some cases, the fractions of liquid adhesive flowing out of the bondline are in fact so great that it is no longer possible to ensure effective bonding of the components. This problem affects, in particular, bonds with a large surface area and/or those applications where the surfaces of the components to be bonded are uneven, being inclined or in complex 3D shape, for example, with gap differences of up to several mm. Furthermore, the liquid adhesive is activated generally at elevated temperatures, which can be a problem for sensitive components. A further disadvantage is that because of the low epoxide content of the liquid adhesives, while it is possible to increase the tack for better positioning of the components to be bonded, the bond strengths of the bonded components are restricted at the same time, since the shear strengths go up in line with the epoxide fractions of the liquid adhesives.

One option for preventing the "bleeding out" caused by the liquification is the preliminary crosslinking of the polymer fraction typically present in the liquid adhesive, using isocyanates, for example. In this case, functional groups in the matrix polymers, such as —OH, —NH and —COOH, for example, react with isocyanate crosslinkers—preference is given to use of polyfunctional isocyanates, such as Desmodur N 3300. Where matrix polymers, such as polyurethanes, for example, are used, the terminal hydroxyl groups can be utilized for the crosslinking. Here it has emerged as being advantageous to admix the adhesive with OH-functional units of low molecular weight (e.g., Capa 2203, low molecular weight polycaprolactone, $M_n$~2000 g/mol), in order to accelerate the crosslinking. Such systems, while they do exhibit reduced bleeding, are nevertheless poorly suited to the bridging of gaps.

DE 10 2011 008 191 A1 describes a heat-activatable, structural, pressure-sensitive adhesive tape having a fabric carrier, which can be used to laminate a plurality of adhesive layers together, to give a thickness which is able to compensate tolerances in the application and is able to conform more effectively to dished or curved surfaces. Moreover, the fabric allows the adhesive, if it is liquid during heating, to flow through and to connect with the adhesive on the other side of the fabric. The wicking of liquid constituents of the adhesive through the fabric may mean that the adhesive does not penetrate the fabric uniformly. The wicking, however, ensures that an assembly which is not yet fully cured does not slip. A key component of the adhesive described is preferably an epoxy-functional acrylate polymer. A disadvantage of the pressure-sensitive adhesive system is that the fabric carrier is in most cases poorly suited to the bridging of gaps and has limited heat resistance, and so it cannot be used together with adhesives which require high temperatures for curing. Accordingly, the pressure-sensitive adhesive system described can be employed, for example, for attaching a mirror mount to the windshield of an automobile, but not for other typical adhesive-bonding applications which take place in the process of manufacturing an automobile and which customarily require temperatures of 180° C. over 30 minutes.

There exists, consequently, a need for a pressure-sensitive adhesive system for structural bonding that solves the problems described above and that enables in particular a satisfactory bond strength on the part of the components bonded using the system, as well as an initial tack.

Problem for the Present Invention

The problem addressed by the present invention is therefore that of providing an improved, flexible, pressure-sensitively adhesive sheetlike structure for structural bonding, especially for compensating gap differences between the components to be bonded. Against this background, the present invention proposes a flexible, pressure-sensitively adhesive sheetlike structure as defined in the claims, to circumvent the above-described problems of the known liquid adhesives.

Provided more particularly is a flexible, pressure-sensitively adhesive sheetlike structure which is easy to handle and which already exhibits tack, so that there is no slipping during application to the components to be bonded, and so that bonding more precisely than with the liquid adhesives known in the prior art is made possible. Moreover, the flexible, pressure-sensitively adhesive sheetlike structure of the present invention is characterized in that the structure remains dimensionally stable in the thermal full-curing step and, accordingly, does not flow out or "bleed out" from the bondline, so that the bonding of the components to be bonded is ensured at any time and at the same time it is possible to attain high bond strengths. Moreover, with the flexible, pressure-sensitively adhesive sheetlike structure of the invention, it is possible to compensate gap differences of up to several mm between the components to be bonded, this being referred to as gap filling.

SUMMARY OF THE INVENTION

The present invention relates to a flexible, pressure-sensitively adhesive sheetlike structure, comprising (a) an open-cell foam substrate and (b) at least one thermally curable pressure sensitive adhesive, which is disposed on both sides of the open-cell foam substrate, wherein the thermally curable pressure sensitive adhesive comprises at least (i) a polymer, at least (ii) a reactive component, at least (iii) an activator, and optionally (iv) a tackifier resin, wherein the thermally curable pressure sensitive adhesive comprises at least 100 parts of reactive component (ii) per 100 parts of polymer (i) and, where used, tackifier resin (iv). The flexible, pressure-sensitively adhesive sheetlike structure of the present invention is intended for structural bonding, more particularly for the compensation of gap differences in the components to be bonded.

Further provided are a method for producing a flexible, pressure-sensitively adhesive sheetlike structure as described above, and a kit comprising at least one flexible, pressure-sensitively adhesive sheetlike structure as described above. Provided furthermore are a flexible, pressure-sensitively adhesive sheetlike structure obtainable by the methods stated, and a composite body connected by a flexible, pressure-sensitively adhesive sheetlike structure of the present invention.

The flexible, pressure-sensitively adhesive sheetlike structure of the present invention is suitable for improved structural bonding, more particularly for the clearance compensation or gap filling of diverse materials.

DETAILED DESCRIPTION OF THE INVENTION

In accordance with the invention, the problem described above is solved by a flexible, pressure-sensitively adhesive sheetlike structure which comprises (a) an open-cell, flexible foam as carrier and (b) at least one thermally curable pressure sensitive adhesive, laminated onto each side of the open-cell, flexible foam. The present invention is described in detail hereinbelow.

Open-Cell Foam Substrate (a)

The flexible, pressure-sensitively adhesive sheetlike structure of the present invention comprises an open-cell foam substrate (a) which is preferably flexible and/or compressible. The function of this foam substrate is to form an inert scaffold for the thermally curable pressure sensitive adhesive, so that the latter does not give rise to the problems identified in the prior art, but instead, before or during the thermal curing, in liquefied and/or low-viscosity form, is taken up by the open-cell foam substrate as carrier and is subsequently consolidated in this carrier, i.e., incorporated therein. In this way, greater ease of handling is ensured during bonding, and the outflow (or "bleeding out") of the thermally curable pressure sensitive adhesive is prevented, and so the bonding to be achieved is ensured rapidly and durably. After the curing of the thermally curable pressure sensitive adhesive, the open-cell foam substrate is no longer flexible and no longer compressible, but is instead fixed in the desired shape by the cured pressure sensitive adhesive.

Inert in this context means that the reactive component (ii) of the thermally curable pressure sensitive adhesive, i.e., reactive monomers and/or reactive resins, such as (meth) acrylates or epoxy resins, under suitably selected conditions, such as sufficiently low temperatures, for example, after curing, substantially does not react with the open-cell foam substrate.

Foams which can be used as the open-cell foam substrate in the sense of the present invention are all open-cell foams. An "open-cell foam substrate" (or else "open-cell foam" or "open-cell foam material") is a substrate having a cellular structure and a low density, which is able to reduce its volume significantly, preferably by means of pressure—that is, it is compressible—and yet which still has elastic or viscoelastic behavior with a minimum recovery force. "Open-cell" in this context means that the cell walls of the foam are not closed, i.e., that liquids can be taken up. At the extreme, in accordance with the invention, the open-cell foam substrate consists only of cell struts. Contrasting with this are closed-cell foam substrates, in which the walls between the individual cells are closed completely, i.e., are fundamentally unable to take up any liquids. Mixed-cell foams contain both kinds of cells. The "open-cell foam substrate" in the sense of the invention must in principle be capable of taking up liquids (or of taking up the pressure sensitive adhesive that is liquefied in the course of curing), meaning that mixed-cell foam substrates as well are suitable in principle.

The open-cell foam substrate may be present in any desired form. The open-cell foam substrate is preferably already in the form of a sheet, a tape or a strip of any desired width or else of a pad of any desired contour, which may optionally be wound to form a roll. Alternatively, the open-cell foam substrate may be wound to form a roll during the method (step E) and slit to form a tape of any desired width, to form strips of any desired width, or to form pads of any desired contour.

The thermally curable pressure sensitive adhesive must in principle be able to wet the foam substrate. The temperature stability of the foam substrate is preferably higher than the crosslinking temperature of the pressure sensitive adhesive. Preferred for use are polar foam substrates having a high surface energy, meaning that the surface energy of the foam substrate is higher than the surface energy of the pressure sensitive adhesive.

Suitable open-cell foam substrates for use in the present invention are elastomers, i.e., chemically crosslinked plastics, and they are preferably selected from the following list: polyurethane and/or derivatives thereof, especially elastomeric polyurethane esters and ethers, melamine and/or derivatives thereof, nitrile rubber, polystyrene and/or phenolic resins.

An "elastomer" consists in principle of principal valence chains (polymer chain depending on chemical construction) which only have wide-mesh crosslinking. At relatively low external forces, the principal valence chains are able to slide over one another with stretching of the crosslinking bonds. They remain, however, connected to one another and possess a restoring force. They contrast with "thermoplastics", which are constructed from unbranched, i.e., linear, principal valence chains (polymer chains depending on chemical construction), and which are joined to one another only by weak physical bonds (i.e., without chemical crosslinking).

One preferred embodiment of the invention uses a flexible polyurethane foam, more particularly an elastomeric polyurethane ester or ether.

One particularly preferred embodiment of the invention uses foam substrates of the Inducon® series, which are available from Mayser GmbH & Co. KG Polymer Electric, Örlinger Str. 1-3, 89073 Ulm, Germany. Foam substrates of the Inducon® series are cellular polyurethane elastomers which are based on thermally compacted flexible ester or ether foam.

The thickness of the open-cell foam substrate in accordance with the invention is in the range from about 0.1 mm to 5 mm, preferably about 0.2 to 0.8 mm.

The pore count of the foam substrate in accordance with the invention is in the range from about 10 to 110 PPI (PPI=pores per inch), preferably about 60 to 80 PPI. The pores are preferably regular and/or defined.

The density (or the weight per unit volume) of the open-cell foam substrate in accordance with the invention is in the range from about 5 kg/m$^3$ to 1000 kg/m$^3$, preferably 40 kg/m$^3$ to 800 kg/m$^3$, more particularly 100 kg/m$^3$ to 600 kg/m$^3$. For pressure-sensitively adhesive sheetlike structures that are particularly well-balanced in respect of the elastic behavior before curing and the bond strength after curing, suitable foams are those having densities of 350 kg/m$^3$-600 kg/m$^3$, preferably 375-500 kg/m$^3$.

Thermally Curable Pressure Sensitive Adhesive (b)

The pressure-sensitively adhesive sheetlike structure of the invention comprises at least one thermally curable pressure-sensitive adhesive film on each side of the open-cell foam substrate. The individual components of the thermally curable pressure sensitive adhesive (b) are set out below:

Polymer (i)

The polymer (i) may be a polymer or a mixture of two or more different polymers. The at least one polymer is preferably an elastomer or a thermoplastic.

Examples of polymers are elastomers, of the kind commonly used in the field of pressure sensitive adhesives (PSAs) or else as described in the Handbook of Pressure Sensitive Adhesive Technology by Donatas Satas (Satas & Associates, Warwick 1999). They are, for example, elastomers based on acrylates and/or methacrylates, polyurethanes, natural rubbers, synthetic rubbers such as butyl, (iso)butyl, nitrile or butadiene rubbers, styrene block copolymers having an elastomer block composed of unsaturated or partially or fully hydrogenated polydiene blocks (polybutadiene, polyisoprene, poly(iso)butylene, copolymers of these, and other elastomer blocks familiar to the skilled person), polyolefins, fluoropolymers and/or silicones.

Where rubber or synthetic rubber or blends produced from them are employed as base material for the adhesive, the natural rubber may in principle be selected from all available grades such as, for example, crepe, RSS, ADS, TSR or CV products, according to the required level of purity and level of viscosity, and the synthetic rubber or synthetic rubbers may be selected from the group of randomly copolymerized styrene-butadiene rubbers (SBR), butadiene rubbers (BR), synthetic polyisoprenes (IR), butyl rubbers (IIR), halogenated butyl rubbers (XIIR), acrylate rubbers (ACM), ethylene-vinyl acetate copolymers (EVA) or polyurethanes and/or blends thereof.

As the at least one polymer it is also possible to employ any kind of thermoplastics known to the skilled person, as identified, for example, in the textbooks: "Chemie and Physik der synthetischen Polymere" by J.M.G. Cowie (Vieweg, Braunschweig) and "Makromolekulare Chemie" by B. Tieke (VCH Weinheim, 1997), such as, for example, poly(ethylene), poly(propylene), poly(vinyl chloride), poly(styrene), poly(oxymethylenes), poly(ethylene oxide), poly(ethylene terephthalate), poly(carbonates), poly(phenylene oxides), poly(urethanes), poly(ureas), acrylonitrile-butadiene-styrene (ABS), poly(amides) (PA), poly(lactate) (PLA), poly(etheretherketone) (PEEK), poly(sulfone) (PSU), poly(ethersulfone) (PES).

Advantageous polymers with very high bond strengths are poly(amides), polyurethanes, acrylonitrile-butadiene rubbers, and poly(ureas), poly(etheretherketone) (PEEK), poly(sulfone) (PSU), poly(ethersulfone) (PES).

One particularly preferred embodiment of the invention uses polyurethanes and/or acrylonitrile-butadiene rubbers.

The polymer may be of linear, branched, star-shaped or grafted structure, to give but a few examples, and may be constructed as a homopolymer, as a statistical copolymer, or as an alternating or a block copolymer. The designation "statistical copolymer" in the sense of this invention includes not only those copolymers in which the comonomers used in the polymerization are incorporated purely statistically, but also those in which there are gradients in the comonomer composition and/or local accumulations of individual kinds of comonomer in the polymer chains.

Individual polymer blocks may be constructed as a copolymer block (statistical or alternating).

Reactive Component (ii)

As a reactive component it is possible in principle to use all reactive constituents which are known to the skilled person in the area of PSAs or reactive adhesives and which form crosslinking macromolecules in a molecular enlargement reaction, such constituents being as described for example in Gerd Habenicht: Kleben-Grundlagen, Technologien, Anwendungen, 6$^{th}$ edition, Springer, 2009. These are, by way of example, constituents which form epoxides, polyesters, polyethers, polyurethanes, polymers based on phenolic resin, on cresol or on novolac, or polysulfides or acrylic polymers (acrylic, methacrylic).

The construction and the chemical nature of the reactive component are not critical, provided they can be produced from precursors which are at least partly miscible with the polymer phase, and the molecular enlargement reaction can be carried out under conditions, particularly with regard to the temperatures employed, the nature of the catalysts used, and the like, that do not lead to any substantial impairment and/or decomposition of the polymer phase.

In accordance with the invention, a suitable reactive component is selected from vinyl compounds; acrylic acid, acrylic esters, methacrylic acid and/or methacrylic esters, such as methyl methacrylate; and/or reactive resins, comprising acrylic and methacrylic esters with alkyl groups, consisting of 4 to 18 carbon atoms. Specific examples of such compounds, without wishing this enumeration to impose any restriction, are n-butyl acrylate, n-butyl methacrylate, n-pentyl acrylate, n-pentyl methacrylate, n-hexyl acrylate, n-hexyl methacrylate, n-heptyl acrylate, n-heptyl methacrylate, n-octyl acrylate, n-octyl methacrylate, n-nonyl acrylate, n-nonyl methacrylate, lauryl acrylate, lauryl methacrylate, hexadecyl acrylate, hexadecyl methacrylate, stearyl acrylate, stearyl methacrylate, behenyl acrylate, behenyl methacrylate, the branched isomers thereof, such as, for example, 2-ethylhexyl acrylate, 2-ethylhexyl methacrylate, isooctyl acrylate, isooctyl methacrylate, isodecyl acrylate, isodecyl methacrylate, tridecyl acrylate, tridecyl methacrylate, and also cyclic monomers, such as, for example, cyclohexyl acrylate, cyclohexyl methacrylate, tetrahydrofurfuryl acrylate, tetrahydrofurfuryl methacrylate, dihydrodicyclopentadienyl acrylate, dihydrodicyclopendadienyl methacrylate, 4-tert-butylcyclohexyl acrylate, 4-tert-butylcyclohexyl methacrylate, norbornyl acrylate, norbornyl methacrylate, isobornyl acrylate, and isobornyl methacrylate.

Additionally employable are acryloylmorpholine, methacryloylmorpholine, trimethylolpropane formal monoacrylate, trimethylolpropane formal monomethacrylate, propoxylated neopentyl methyl ether monoacrylate, propoxylated neopentyl methyl ether monomethacrylate, tripropylene glycol methyl ether monoacrylate, tripropylene glycol methyl ether monomethacrylate, ethoxylated ethyl acrylate such as ethyl diglycol acrylate, ethoxylated ethyl methacrylate such as ethyl diglycol methacrylate, propoxylated propyl acrylate, and propoxylated propyl methacrylate.

Likewise employable as reactive resins are acrylic and methacrylic esters which contain aromatic radicals, such as, for example, phenyl acrylate, benzyl acrylate, phenyl methacrylate, benzyl methacrylate, phenoxyethyl acrylate, phenoxyethyl methacrylate, ethoxylated phenol acrylate, ethoxylated phenol methacrylate, ethoxylated nonylphenol acrylate, or ethoxylated nonylphenol methacrylate.

It is possible, furthermore, to use aliphatic or aromatic, more especially ethoxylated or propoxylated polyether mono(meth)acrylates, aliphatic or aromatic polyester mono(meth)acrylates, aliphatic or aromatic urethane mono(meth)acrylates or aliphatic or aromatic epoxy mono(meth)acrylates as compounds which carry a (meth)acrylate function.

Preferred for use as compounds which carry at least two (meth)acrylate functions are one or more compounds from the list encompassing difunctional aliphatic (meth)acrylates such as 1,3-propanediol di(meth)acrylate, 1,4-butanediol di(meth)acrylate, 1,6-hexanediol di(meth)acrylate, 1,5-neopentyl di(meth)acrylate, dipropylene glycol di(meth)acrylate, tricyclodecanedimethylol di(meth)acrylate, cyclohexanedimethanol di(meth)acrylate, trifunctional aliphatic (meth)acrylates such as trimethylolpropane tri(meth)acrylate, tetrafunctional aliphatic (meth)acrylates such as ditrimethylolpropane tetra(meth)acrylate or ditrimethylolpropane tetra(meth)acrylate, pentafunctional aliphatic (meth)acrylates such as dipentaerythritol mono-hydroxypenta(meth)acrylate, hexafunctional aliphatic (meth)acrylates such as dipentaerythritol hexa(meth)acrylate. Further, if more highly functionalized compounds are being used, it is possible to utilize aliphatic or aromatic, especially ethoxylated and propoxylated polyether (meth)acrylates having, in particular, two, three, four or six (meth)acrylate functions, such as ethoxylated bisphenol A di(meth)acrylate, polyethylene glycol di(meth)acrylate, propoxylated trimethylolpropane tri(meth)acrylate, propoxylated glycerol tri(meth)acrylate, propoxylated neopentylglycerol di(meth)acrylate, ethoxylated trimethylol tri(meth)acrylate, ethoxylated trimethylolpropane di(meth)acrylate, ethoxylated trimethylolpropane tri(meth)acrylate, tetraethylene glycol di(meth)acrylate, ethoxylated neopentyl glycol di(meth)acrylate, propoxylated pentaerythritol tri(meth)acrylate, dipropylene glycol di(meth)acrylate, ethoxylated trimethylolpropane methyl ether di(meth)acrylate, aliphatic or aromatic polyester (meth)acrylates having, in particular, two, three, four or six (meth)acrylate functions, aliphatic or aromatic urethane (meth)acrylates having, in particular, two, three, four or six (meth)acrylate functions, aliphatic or aromatic epoxy(meth)acrylates having, in particular, two, three, four or six (meth) acrylate functions.

Envisaged with particular preference as reactive component (ii) of the PSA are, in accordance with the invention, epoxy resins and/or a mixture of different epoxy resins.

A suitable reactive resin in accordance with the invention is an epoxy resin and/or a mixture of different epoxy resins, such as monomeric or polymeric, aliphatic, cycloaliphatic or aromatic epoxides, for example. These materials generally have on average at least two epoxide groups per molecule, preferably more than two epoxide groups per molecule. The "average" number of epoxide groups per molecule is defined as the number of epoxide groups in the epoxide-containing material, divided by the total number of epoxide molecules present. The polymeric epoxides comprise linear polymers having terminal epoxide groups (e.g., a diglycidyl ether of a polyoxyalkylene glycol), polymers having framework oxirane units (e.g., polybutadiene polyepoxide), and polymers having epoxide side groups (e.g., a glycidyl methacrylate polymer or copolymer). The molecular weight of the epoxide-containing material may vary from 58 to about 100 000 g/mol or more. Mixtures of different epoxide-containing materials may also be used in hotmelt compositions of the invention.

Useful epoxide-containing materials include those which contain cyclohexene oxide groups, especially epoxycyclohexane carboxylates, such as, for example, 3,4-epoxycyclohexylmethyl 3,4-epoxycyclohexanecarboxylate, 3,4-epoxy-2-methylcyclo-hexylmethyl 3,4-epoxy-2-methylcyclohexanecarboxylate, and bis(3,4-epoxy-6-methylcyclohexylmethyl) adipate.

Other epoxide-containing materials which are useful in accordance with the invention are glycidyl ethers of polyhydric phenols, which are obtained by reaction of a polyhydric phenol with an excess of chlorohydrin, such as epichlorohydrin (e.g., the diglycidyl ether of 2,2-bis(2,3-epoxypropoxyphenol)propane). Other examples of epoxides of this type which can be used in the application of this invention are described in U.S. Pat. No. 3,018,262.

There are a host of commercially available epoxide-containing materials that can be used in this invention. The following may be mentioned in particular here: octadecylene oxide, epichlorohydrin, styrene oxide, vinylcyclohexene oxide, glycidol, glycidyl methacrylate, diglycidyl ethers of bisphenol A (e.g., those available under the tradenames EPON 828, EPON 1004 and EPON 1001F from Shell Chemical Co. and DER-332 and DER-334 from Dow Chemical Co.), diglycidyl ethers of bisphenol F (e.g. ARALDITE GY281 from Ciba-Geigy), vinylcyclohexene dioxide (e.g. ERL 4206 from Union Carbide Corp.), 3,4-epoxycyclohexylmethyl 3,4-epoxycyclohexene-carboxylate (e.g. ERL-4221 from Union Carbide Corp.), 2-(3,4-epoxycyclohexyl-5,5-spiro-3,4-epoxy)cyclohexane-metadioxane (e.g. ERL-4234 from Union Carbide Corp.), bis(3,4-epoxycyclohexyl) adipate (e.g., ERL-4299 from Union Carbide Corp.), dipentene dioxide (e.g., ERL-4269 from Union Carbide Corp.), epoxidized polybutadiene (e.g., OXIRON 2001 from FMC Corp.), silicone resin-containing epoxide functionality, epoxysilanes (e.g., beta-(3,4-epoxycyclohexyl)ethyltri-methoxysilane and gamma-glycidoxypropyltrimethoxysilane, available commercially from Union Carbide), flame-retardant epoxy resins (e.g., DER-542, a brominated bisphenol-type epoxy resin, available from Dow Chemical Co.), 1,4-butanediol diglycidyl ethers (e.g., ARALDITE RD-2 from Ciba-Geigy), hydrogenated epoxy resins based on bisphenol A epichlorohydrin (e.g., EPONEX 1510 from Shell Chemical Co.), and polyglycidyl ethers of phenol formaldehyde novolac (e.g., DEN-431 and DEN-438 from Dow Chemical Co.).

The amount of the reactive component in accordance with the invention is at least 100 parts of reactive component (ii), preferably at least 200 parts of reactive component (ii), more preferably at least 300 parts of reactive component (ii), per 100 parts of polymer (i) and, where used, tackifier resin (iv).

So that the adhesive softens adequately in the thermal full-curing step and, accordingly, flows well into the foam, the molecular weight of the reactive component is preferably less than 100 000 g/mol. The pressure-sensitive adhesive properties in the uncured state are particularly good if the molecular weight of the reactive component is less than 10 000 g/mol and/or the softening point is below 110° C., preferably below 100° C.

Activator (iii)

As used herein, the term "activator" (or else "initiator" or "curing agent") stands for a compound which is able to initiate a polymerization reaction or crosslinking of the PSA or is able to participate therein as a reaction partner to the reactive component.

At least one activator (iii) is added to the pressure sensitive adhesive of the invention.

It is possible to use all activators that are known in the prior art, depending on the reactive component (ii) selected. For acrylate-based reactive monomers, use is made of radical activators, such as peroxides, hydroperoxides, and azo compounds, for example. For epoxide-based reactive resins, use is made of aminic or thiolic activators or else of acidic activators, such as, for example, aliphatic amines, aromatic amines, modified amines, polyamide resins, acid anhydrides, secondary amines, mercaptans, especially polymercaptans, polysulfides, dicyandiamide, organic acid hydrazides.

Particularly preferred in accordance with the invention are aminic activators (iii), especially dicyandiamide, for use for the above-described epoxide-based reactive components (ii). In this case the amount of the activator is dependent on the amount of epoxide and on the epoxide equivalents of the epoxide used. The calculation is made in analogy to the calculation known to the skilled person, via epoxy equivalents and amine equivalents of the activator, and is described for example in "Formulierung von Kleb- and Dichtstoffen" by Bodo Müller and Walter Rath (section 2.2.2).

Accelerator

As used herein, the term "accelerator" (or else "booster") stands for a compound which even at very low concentrations accelerates the process of the polymerization.

In the present invention, an accelerator can be added to the thermally curable PSA. The effect of this accelerator is to lower the onset temperature for the crosslinking reaction of the reactive component, more particularly of the epoxy resin. In this way, handling is improved at the bonding stage.

As accelerators it is possible in particular to use modified and unmodified imidazoles, urea derivatives, acid anhydrides, tertiary amines, polyamines, and combinations thereof, such as, for example, urons of the Dyhard® series, which are available from AlzChem AG, CHEMIEPARK TROSTBERG, Postfach 1262, 83303 Trostberg, Germany. Mention may be made here by way of example of Accelerator 960-1, Accelerator 2950, Accelerator 3130, DT 3126-2, XB 5730, or DY 070, which are available from Huntsman International LLC.

The amount of the accelerator is determined in relation to the reactive resin fraction and is expressed in phr (parts per 100 resin). In accordance with the invention, the amount is in the range from greater than 0 to about 6 phr, preferably about 0.1-3.0 phr. Employed with the greatest preference are about 0.2-1.0 phr, based in each case on the total amount of reactive resins in the thermally curable PSA.

Tackifier Resins

For the present invention it is possible to use tackifier resins, though a tackifier resin is not indispensable for the adhesives of the present invention. Even without the addition of tackifier resin, the desired tack of the adhesive is achieved.

Where tackifier resins are employed, those suitable for the purpose are tackifier resins of the kind known to the skilled person, for example, from the abovementioned work by Satas. The PSA in this case may comprise at least one kind of a preferably at least partly hydrogenated tackifier resin, as for example of one which is compatible with the elastomer component and—where a copolymer constructed of hard blocks and soft blocks is used—compatible primarily with the soft block (plasticizing resins).

A corresponding tackifier resin may have a softening temperature, measured by the ring&ball method, of greater than 25° C., and may additionally feature at least one kind of tackifier resin having a softening temperature of less than 20° C. By this means it is possible, if necessary, on the one hand to fine-tune the technical adhesive behavior but on the other hand also to fine-tune the flow behavior on the bonding substrate.

For relatively apolar elastomers it is possible, as resins in the PSA, to use partially or fully hydrogenated resins based on rosin and rosin derivatives, hydrogenated polymers of dicyclopentadiene, partially, selectively or fully hydrogenated hydrocarbon resins based on $C_5$, $C_5/C_9$ or $C_9$ monomer streams, polyterpene resins based on α-pinene and/or ß-pinene and/or δ-limonene and/or $\Delta^3$-carene, hydrogenated polymers of preferably pure $C_8$ and $C_9$ aromatics. Aforesaid tackifier resins may be used either alone or in a mixture.

In this context, it is possible to employ both liquid resins and resins which are solid at room temperature. In order to ensure high aging stability and UV stability, there is a preference for hydrogenated resins having a degree of hydrogenation of at least 90%, preferably of at least 95%.

Further Constituents of the Thermally Curable Pressure Sensitive Adhesive

The reactive adhesive films of the present invention may optionally comprise further additives and/or auxiliaries which are known in the prior art, such as, for example, rheology modifiers, flame retardants, foaming agents, fillers, plasticizers, crosslinkers, UV stabilizers, antioxidants or adhesion promoters.

It is possible advantageously to add inductively heatable metals in finely divided form (iv) to the thermally curable pressure sensitive adhesive, hence allowing heating to take place via induction.

Pressure Sensitive Hotmelt Adhesive

The thermally curable pressure sensitive adhesive (b) of the present invention may, depending on the choice of the polymer (i), the reactive component (ii), and the activator (iii), be a thermally curable pressure sensitive hotmelt adhesive, which is typically solid at room temperature (23° C.). After heating to temperatures in the range of 40-140° C., the pressure sensitive hotmelt adhesive becomes melted or liquefied, in order thus to give a liquid PSA. "Melting" or "liquefaction" in the sense of the invention is therefore intended to encompass the bringing of the hotmelt adhesive into a flowable form.

A "hotmelt adhesive" stands here for an adhesive which is solid at room temperature (23° C.) (peel adhesion on steel <1 N/cm) and which, after heating to temperatures in the range of 40-140° C., softens and becomes tacky. The melted hotmelt adhesive is typically contacted or coated in the hot state with the release liner and on cooling forms a solid connection with curing. Accordingly, in accordance with the invention, a pressure sensitive hotmelt adhesive is a very viscous PSA or a very flowable hotmelt adhesive, both of which drastically alter their flow properties under heating.

Flexible, Pressure-Sensitively Adhesive Sheetlike Structure

In one preferred embodiment in accordance with the invention, the flexible, pressure-sensitively adhesive sheetlike structure comprises an open-cell polyurethane foam (a) with at least one thermally curable pressure sensitive adhesive (b) on both sides, with the thermally curable pressure sensitive adhesive (b) comprising the following constituents: (i) a nitrile-butadiene rubber, (ii) epoxy resin based on bisphenol F diglycidyl ether, (iii) dicyandiamide, and (iv) a 1,1-dialkyl-3-arylurea (uron accelerator).

In an alternative preferred embodiment in accordance with the invention, the flexible, pressure-sensitively adhesive sheetlike structure comprises an open-cell polyurethane foam (a) with at least one thermally curable pressure sensitive adhesive (b) on both sides, with the thermally curable pressure sensitive adhesive (b) comprising the following constituents: (i) an elastic polyurethane, (ii) dicyclopentadiene epoxy novolac resin, (iii) dicyandiamide, and (iv) a 1,1-dialkyl-3-arylurea (uron accelerator).

The flexible, pressure-sensitively adhesive sheetlike structure which is produced by the method of the invention comprises in the simplest case an open-cell foam substrate and the thermally curable pressure sensitive (hotmelt) adhesive and may be prepared by the method described herein.

A "pressure-sensitively adhesive sheetlike structure" here is a sheetlike foam substrate as carrier material, which is covered optionally on both sides with pressure sensitive (hotmelt) adhesive and lined with a release liner, and wound up to form an Archimedean roll. From the pressure-sensitively adhesive sheetlike structure it is also possible, by printing and diecutting, to produce self-adhesive labels in tape form by methods which are known in the prior art.

The pressure-sensitively adhesive sheetlike structure obtainable by the method of the invention is preferably a pressure-sensitively adhesive sheet, tape, strip or pad.

The pressure-sensitively adhesive sheetlike structure of the invention generally possesses a layer thickness in the range of about 0.05 mm-10 mm, preferably about 0.1 mm-5 mm, and more preferably about 0.5 mm-3 mm. For the production of relatively large layer thicknesses it may be of advantage to laminate a plurality of pressure-sensitive adhesive tapes together.

Furthermore, a pressure-sensitively adhesive sheetlike structure of the invention is particularly advantageous when the bond strength of the cured, pressure-sensitively adhesive sheetlike structure, measured by the dynamic shear test on steel, is at least 3 MPa, preferably 8 MPa, more particularly greater than 12 MPa. Such bond strengths ensure a very stable and durable connection between the materials to be bonded, and are also suitable, for example, for bonds with exacting demands with regard to the bond strength, such as in the automobile industry, for example.

Furthermore, the pressure-sensitively adhesive sheetlike structure of the invention may comprise further films, layers, adhesives, (permanent or temporary) carriers, release papers and/or release liners.

Substrates

Suitable substrates appropriate for bonding by the pressure-sensitively adhesive sheetlike structure of the invention are metals, glass, wood, concrete, stone, ceramic, textile and/or plastics. The substrates to be bonded may be alike or different.

In one preferred embodiment, the pressure-sensitively adhesive sheetlike structure of the invention is used for bonding metals, glass, and plastics, particularly with oiled surfaces.

The substrates, moreover, may have been painted, printed, coated by vapor deposition or by sputtering, or otherwise pretreated, such as by flaming, corona, plasma or chemical methods, for example, such as application of a liquid adhesion promoter/primer.

The substrates to be bonded may adopt any desired form which is necessary for the use of the resulting composite body. In the simplest form, the substrates are planar. It is also possible, moreover, to use the pressure-sensitively adhesive sheetlike structure of the invention to bond three-dimensional substrates, which, for example, are inclined or have a complex 3D structure. Gap differences occurring between the substrates, in particular, may be compensated using the pressure-sensitively adhesive sheetlike structure of the invention (referred to as "clearance compensation").

Method for Producing a Flexible, Pressure-Sensitively Adhesive Sheetlike Structure A pressure-sensitively adhesive sheetlike structure of the invention is produced by the method described below:

In a first step (step A.(I)), the ingredients, as defined in claim 10, are dissolved or finely distributed, and mixed, in one or more solvents. The mixture is produced using customary stirring apparatus. Alternatively a solvent is not needed, since the ingredients are already fully soluble in one another (with exposure where appropriate to heat and/or shearing).

As used herein, the term "ingredient" encompasses the polymer (i) used, the reactive component (ii), the activator (iii), and also further components optionally present, as defined above.

Suitable solvents are known in the prior art, and solvents preferably used are those in which at least one of the ingredients has good solubility. Particularly preferred is butanone or acetone.

In an alternative embodiment (step A.(II)), a pressure sensitive hotmelt adhesive, comprising the ingredients as defined above, can be melted or liquefied with heating at temperatures in the range of 40-140° C., to give a liquid to pastelike pressure sensitive adhesive suitable for subsequent coating. "Melting" in the sense of the invention is therefore intended to include the bringing of the hotmelt adhesive into a flowable form.

A "pressure sensitive hotmelt adhesive" here is a pressure sensitive adhesive which is in solid form at room temperature (23° C.) and is converted into a flowable form after heating to temperatures in the range of 40-140° C. A release liner is typically coated with the hotmelt adhesive in the hot state, rendered flowable via temperature increase, and cools to form a solid connection with curing. Consequently, in accordance with the invention, a pressure sensitive hotmelt adhesive is a very viscous PSA or a very flowable hotmelt adhesive, both of which alter their flow properties drastically under heating.

Subsequently, in a second step (step B), a liner (or release paper/release liner) is coated with the mixture of the dissolved or finely distributed ingredients according to step A.(I) or with a pressure sensitive hotmelt adhesive, melted with heating, according to step A.(II), and comprising the ingredients. Coating takes place in accordance with the usual techniques which are known in the prior art. The layer thickness of the resultant pressure-sensitive adhesive film on the liner is preferably in the range from about 50 to 500 μm, more preferably in the range from about 75 to 300 μm, very preferably in the range from about 100 to 250 μm. In accordance with the invention, the shear strengths (and hence the bond strengths and the cured, bonded state) increase in line with the layer thickness of the pressure-sensitive adhesive films laminated onto the foam substrate.

A "liner" is a release paper with a nonstick surface that can be produced by impregnating or by coating a suitable carrier material, such as a film, with a material having water repellency (hydrophobic) and/or oil repellency (oleophobic) properties, such as silicone, oil, fat, polypropylene or fluorocarbon, for example. The liner serves to protect the surface of the adhesive and permits the transfer of the solidified pressure sensitive adhesive or adhesives onto the open-cell foam substrate, as described below.

In one preferred embodiment of the invention, the viscosity of the pressure sensitive adhesive is increased after the liner has been coated but before the foam substrate has been laminated. This increase in viscosity may be achieved by (I) evaporation of a solvent, if present, at room temperature (23° C.) over a period of several minutes up to several hours, such as overnight, (II) cooling of the product obtained from step B to room temperature (23° C.), if a hotmelt adhesive according to step A.(II) has been used or if the pressure sensitive adhesive according to step A.(I) has been heated, or (III) preliminary crosslinking (or preliminary curing) of the adhesive by radiation or chemical reaction at elevated temperature. Preliminary crosslinking may be carried out, for example, by electron steel beam treatment.

In a fourth step (step D), a flexible, open-cell foam substrate as described above is laminated with at least two pressure-sensitive adhesive films obtained from step C, optionally still lined with the release liner on the side facing away from the foam, onto one side of the foam substrate in each case. In this way, the pressure-sensitively adhesive sheetlike structure of the invention is produced.

The flexible, pressure-sensitively adhesive sheetlike structure of the present invention may optionally be wound up to form a roll in a further step (step DE), optionally together with a release liner.

For storage, the flexible, pressure-sensitive adhesive tapes of the invention are preferably lined with a release liner or release paper.

Kit for Providing a Pressure-Sensitively Adhesive Sheetlike Structure of the Invention Also provided in accordance with the invention is a kit for providing a flexible, pressure-sensitively adhesive sheetlike structure, the kit comprising at least one flexible, pressure-sensitively adhesive sheetlike structure as described above. A further constituent in the kit might be, for example, a shaped part to be bonded, an interior trim element for an automobile, or an auxiliary means for applying the flexible, pressure-sensitively adhesive sheetlike structure to a substrate, and the constituents of the kit may be present in a joint pack.

The flexible, pressure-sensitively adhesive sheetlike structure of a kit of the invention is used typically as follows:

The flexible, pressure-sensitively adhesive sheetlike structure is applied to a surface of a substrate to be bonded. This substrate is next contacted with a surface of a second substrate to be bonded, and the surfaces are left in contact for a pressing time in the range from several seconds up to a number of minutes at room temperature (23° C.), and the assembly is subsequently heated at elevated temperatures, such as, for example, 100 to 200° C., preferably about 160° C. or 180° C., for a time in the range from several minutes up to 1 h, so causing the pressure sensitive adhesive to liquefy and to penetrate the pore structure of the foam substrate or to be taken up by this pore structure, and also causing the initiation of crosslinking or polymerization reaction on the part of the ingredients, particularly the reactive component, and the curing (thermal full curing) of the thermally curable pressure sensitive adhesive. The uptake of the liquid adhesive or of the melted hotmelt adhesive into the pores of the open-cell foam substrate may also be viewed as a wicking or impregnation during the thermal crosslinking. During the crosslinking, in accordance with the invention, preferably at least 50% of the pores in the open-cell foam substrate are filled, ideally completely, with the liquid adhesive or with the melted hotmelt adhesive.

"Thermally curable" means in accordance with the invention that the crosslinking of the individual components of the pressure sensitive adhesive lowers the flowability of the thermally curable pressure sensitive adhesive within the foam structure.

After the bonding and thermal curing/crosslinking, the foam substrate is fixed in the form dictated by the substrates to be bonded, by means of the pressure sensitive adhesive which has cured in the pores of the open-cell foam substrate, and here it is possible to achieve bridging of gap differences, so allowing even substrates of complex shape which do not fit exactly to one another, being characterized, that is, by an uneven bondline, to be bonded to one another.

Composite Body

Further provided in accordance with the invention is a composite body which is connected by the flexible, pressure-sensitively adhesive sheetlike structure of the invention, as defined above, or by the kit of the invention, as defined above. A "composite body" in this context is any three-dimensional object which consists of at least two substrates held together via the pressure-sensitively adhesive sheetlike structure of the invention, after curing.

Experimental Section

The examples which follow serve to illustrate the present invention, but are in no way to be interpreted as imposing any limitation on the scope of protection.

Measurement Methods

Peel Adhesion

The peel adhesions on steel were determined in analogy to ISO 29862 (Method 3) at 23° C. and 50% relative humidity with a peeling velocity of 300 mm/min and a peel angle of 180°. An etched PET film with a thickness of 36 µm was used as a reinforcing film, this film being of the kind obtainable from Coveme (Italy). The bonding of the pressure-sensitively adhesive sheetlike structure here was undertaken by means of a roll-on machine at a temperature of 23° C. The pressure-sensitive adhesive tapes were peeled off immediately after application. The measurement value (in N/cm) was obtained as the mean value from three individual measurements.

Bond Strength (Tensile Shear)

As a parameter for the quality of the bonding obtained, the bond strength of an assembly produced with the pressure-sensitively adhesive sheetlike structure of the invention was determined for the various pressure-sensitive adhesive tapes. For this purpose, the bond strength was determined quantitatively in each case in a dynamic tensile shear test in a method based on DIN-EN 1465 at 23° C. and 50% relative humidity and with a testing velocity of 10 mm/min (results in $N/mm^2=MPa$). The materials for bonding used were materials of steel which have been cleaned with acetone prior to bonding. The layer thicknesses of the pressure-sensitive adhesive tapes corresponded in each case to the sum totals of the two adhesive films and of the foam thickness (cf. table 2). The value reported is the mean from three measurements.

Starting Materials

| | |
|---|---|
| Breon N41H80 | Nitrile-butadiene rubber with an acrylonitrile fraction of 41% from Zeon Chemicals (London, UK) |
| Desmomelt 530 | Largely linear hydroxyl polyurethane. Desmomelt 530 is a highly crystalline, elastic polyurethane of very low thermoplasticity from Bayer MaterialScience |
| Epon Resin 828 | Difunctional bisphenol-A/epichlorohydrin liquid epoxide with a weight per epoxide of 185-192 g/eq from Momentive. |
| PolyDis PD3611 | Nitrile rubber-modified epoxy resin based on bisphenol F diglycidyl ether with an elastomer content of 40% and a weight per epoxide of 550 g/eq from Schill + Seilacher "Struktol". |
| PolyDis PD3691 | Nitrile rubber-modified epoxy resin based on bisphenol A diglycidyl ether with an elastomer content of 5% and a weight per epoxide of 205 g/eq from Schill + Seilacher "Struktol". |
| Tactix 556 | Dicyclopentadiene epoxy novolac resin with a weight per epoxide of 215-235 g/eq and a softening point of 53° C. from Huntsman. |
| Dyhard 100S | Latent hardener from AlzChem for epoxide systems, consisting of micronized dicyandiamide in which 98% of the particles are smaller than 10 μm. |
| Dyhard UR500 | Difunctional, latent uron accelerator for epoxide systems, in which 98% of the particles are smaller than 10 μm. |

Production of Inventive Pressure-Sensitive Adhesive Tapes

The respective thermally curable pressure sensitive adhesives were produced in the laboratory by dissolving the at least one polymer in butanone at 23° C. Then the reactive resin or resins were added. After that, the curing agent (hardener) was added with strong shearing by means of stirring. The individual components of the adhesives are listed in table 1 below.

TABLE 1

Composition of the pressure sensitive adhesives.

| | Example: | | | | | | |
|---|---|---|---|---|---|---|---|
| | K1 Parts by weight | K2 Parts by weight | K3 Parts by weight | K4* Parts by weight | K5 Parts by weight | K6 Parts by weight | V1 Parts by weight |
| Breon N41H80 | — | — | — | — | 25 | 25 | — |
| Desmomelt 530 | 20 | 30 | 40 | 50 | — | — | 60 |
| Epon Resin 828 | — | — | — | — | 75 | — | — |
| PolyDis PD3611 | — | — | — | — | — | 60 | — |
| PolyDis PD3691 | — | — | — | — | — | 15 | — |
| Tactix 556 | 80 | 70 | 60 | 50 | — | — | 40 |
| Dyhard 100S | 4.62 | 4.04 | 3.47 | 2.89 | 5.13 | 2.37 | 2.31 |
| Dyhard UR500 | 0.4 | 0.35 | 0.3 | 0.25 | 0.38 | 0.38 | 0.2 |

*Pressure sensitive hotmelt adhesive.

The adhesives were coated out onto a siliconized PET film from solutions in butanone (solids content: 40 wt % to 50 wt %), the solvent was removed at 105° C., and the open side was lined with a second siliconized liner. The layer thicknesses were 50 μm±3 μm and 100 μm±5 μm. The inventive adhesive tapes were produced by laminating these pressure-sensitive adhesive films onto both sides of corresponding foams. Constructions of this kind are described in detail in table 2 below:

TABLE 2

Construction of the pressure-sensitive adhesive tapes.

| | Construction | | | | | | | | | |
|---|---|---|---|---|---|---|---|---|---|---|
| | A1 | A2 | A3 | A4 | A5 | A6 | A7 | A8 | VA1 | VA2 |
| Inducon VP3036 S 400 open-cell d = 400 μm | 1x | 1x | 1x | 1x | 1x | 1x | 1x | 1x | 1x | |
| Inducon VP2311 T 400 closed-cell d = 400 μm | | | | | | | | | | 1x |
| Adhesive | K1 | K2 | K3 | K4 | K5 | K5 | K5 | K6 | V1 | K6 |
| Layer thickness side 1/μm | 200 | 200 | 200 | 200 | 100 | 150 | 200 | 150 | 200 | 150 |
| Layer thickness side 2/μm | 200 | 200 | 200 | 200 | 100 | 150 | 200 | 150 | 200 | 150 |

TABLE 3

Results of measurement.

| | Construction | | | | | | | | | |
|---|---|---|---|---|---|---|---|---|---|---|
| | A1 | A2 | A3 | A4 | A5 | A6 | A7 | A8 | VA1 | VA2 |
| Peel adhesion, steel/N cm$^{-1}$ | 12.3 | 10.9 | 6.7 | 0.6 | 11.2 | 10.6 | 10.2 | 8.2 | 0 | 8.9 |
| Bond strength/MPa | 12.4 | 9.5 | 6.8 | 3.7 | 4.6 | 7.3 | 10.9 | 9.1 | 0.83 | 0.76 |
| Fracture mode | c-t | c-t | c-t | c-t | c-t | c-t | c-t | c-t | c-e | c-e | c-t: cohesive-thermoset,
c-e: cohesive foam fracture (elastic foam)

As shown in table 3, a comparison of the comparative construction VA1 with the inventive constructions A1-A4 indicates that as the fraction of reactive resin goes down, there are drops both in the peel adhesion of the uncured constructions and in the shear strengths in the cured state. To allow VA1 to be measured in spite of the absence of peel adhesion, the two steel substrates were heated to 50° C. for bonding. If the reactive resin fraction is too low (<50 wt %) or if the matrix polymer content is too high, there is a sharp reduction in the capacity of the adhesives to flow into the open pores, and so a clear foam fracture is already in evidence in the case of VA1. This is readily apparent, because the cohesive fracture pattern indicates an elastic foam. In contrast, the inventive constructions A1-A4 exhibit cohesive fracture patterns, being very hard thermosets.

The open-cell foams of constructions A5-A7 were equipped with adhesive films differing in thickness. The shear strengths increase in line with the layer thickness of the adhesive films laminated on the foam substrate. The greater the amount of adhesive present, the better and more completely the pores of the foam become wetted and filled with adhesive in the curing step.

A comparison of A8 and VA2 shows that an open-pore foam structure is of elemental importance in obtaining bond strengths of greater than 2 MPa. Only in this way is the foam reinforced with the inflowing, curing adhesive.

The invention claimed is:

1. A flexible, pressure-sensitively adhesive sheetlike structure for structural bonding, comprising:
    (a) an open-cell flexible foam substrate having pores therein and comprising one or more cellular polyurethane elastomers based on thermally compacted flexible ester foam or ether foam; and
    (b) at least one layer of a thermally curable pressure sensitive adhesive disposed on both sides of the open-cell flexible foam substrate and being lined with a release liner, wherein the thermally curable pressure sensitive adhesive comprises:
        (i) at least one polymer;
        (ii) at least one reactive component;
        (iii) at least one activator; and
        (iv) optionally at least one tackifier resin,
            wherein the thermally curable pressure sensitive adhesive comprises at least 100 parts of reactive component (ii) per 100 parts of the at least one polymer (i) and, when present, the at least one tackifier resin (iv).

2. The flexible, pressure-sensitively adhesive sheetlike structure of claim 1, wherein the open-cell flexible foam substrate (a) is a chemically crosslinked foam.

3. The flexible, pressure-sensitively adhesive sheetlike structure of claim 1, wherein said at least one polymer (i) is selected from an elastomer based on acrylates and/or methacrylates, polyurethanes, natural rubbers, synthetic rubbers; styrene block copolymers having an elastomer block composed of unsaturated or partially or fully hydrogenated polydiene blocks, polyolefins, fluoropolymers and/or silicones; or a thermoplastic.

4. The flexible, pressure-sensitively adhesive sheetlike structure of claim 1, wherein the at least one reactive component (ii) is a reactive resin comprising (meth)acrylic esters having 4 to 18 carbon atoms; or an epoxy resin and/or a mixture of different epoxy resins, optionally an epoxidized nitrile rubber, an epoxy resin based on bisphenol A, bisphenol F or bisphenol S, an epoxy phenol novolac, an epoxy cresol novolac, or a dicyclopentadiene epoxy novolac.

5. The flexible, pressure-sensitively adhesive sheetlike structure of claim 1, wherein the at least one activator (iii) is selected from the group consisting of an aliphatic amine, aromatic amine, modified amine, polyamide resin, acid anhydride, secondary amine, mercaptan and dicyandiamide.

6. The flexible, pressure-sensitively adhesive sheetlike structure of claim 1, wherein the thermally curable pressure sensitive adhesive (b) further comprises inductively heatable metals in finely divided form (v).

7. The flexible, pressure-sensitively adhesive sheetlike structure of claim 1, comprising further films, layers, adhesives, carrier, and/or release paper.

8. The flexible, pressure-sensitively adhesive sheetlike structure of claim 1, wherein at least 50% of the pores in the open-cell flexible foam substrate are filled with the thermally curable pressure sensitive adhesive.

9. A kit comprising at least one of the flexible, pressure-sensitively adhesive sheetlike structure of claim 1.

10. A composite body connected by the flexible, pressure-sensitively adhesive sheetlike structure of claim 1 or by a cured, pressure-sensitively adhesive sheetlike structure obtainable by thermally curing the flexible, pressure-sensitively adhesive sheetlike structure of claim 1.

11. A method for adhesively bonding materials made of metal, wood, glass and/or plastic, said method comprising adhesively bonding said materials with the flexible, pressure-sensitively adhesive sheetlike structure as claimed in claim 1.

12. The method as claimed in claim 11, wherein the materials made of metal, wood, glass and/or plastic are oiled.

13. A method for producing a flexible, pressure-sensitively adhesive sheetlike structure, wherein the method comprises the following steps:
    A. providing a homogeneous pressure sensitive adhesive by
        (I) dissolving and/or finely dividing the ingredients, optionally in one or more solvents, optionally with exposure to heat and/or shearing, to give a homogeneous, thermally curable pressure sensitive adhesive, or
   (II) melting a homogeneous, thermally curable pressure sensitive hotmelt adhesive which comprises the ingredients, with exposure to heat;
B. coating a release liner with the homogeneous, thermally curable pressure sensitive adhesive in step A1.(I) or A1.(II);
C. (I) evaporating the solvent, if present, and/or
   (II) optionally cooling the release liner coated with the adhesive, from step B;
D. laminating a flexible, open-cell foam substrate with at least two pressure-sensitively adhesive films obtained from step C, optionally lined with the release liner on the side facing away from the foam, onto each side of the foam substrate, so as to give a flexible, pressure-sensitively adhesive sheetlike structure; and
E. optionally winding up the flexible, pressure-sensitively adhesive sheetlike structure after step D, to form a roll;
   wherein the ingredients comprise (i) at least one polymer, (ii) at least one reactive component, (iii) at least one activator, and (iv) optionally a tackifier resin and also, optionally, further additives and/or auxiliaries, wherein the thermally curable pressure sensitive adhesive comprises at least 100 parts of reactive component (ii) per 100 parts of polymer (i) and, where used, tackifier resin (iv).

14. A flexible, pressure-sensitively adhesive sheetlike structure obtainable by the method of claim 13.

15. A cured, pressure-sensitively adhesive sheetlike structure obtainable by thermally curing the flexible, pressure-sensitively adhesive sheetlike structure of claim 14.

* * * * *